US008958654B1

United States Patent
Evans et al.

(10) Patent No.: US 8,958,654 B1
(45) Date of Patent: *Feb. 17, 2015

(54) METHOD AND APPARATUS FOR ENHANCING THREE-DIMENSIONAL IMAGERY DATA

(75) Inventors: Bruno J. Evans, Keller, TX (US); Gene D. Tener, Oviedo, FL (US)

(73) Assignee: Lockheed Martin Corporation, Grand Prairie, TX (US)

( * ) Notice: Subject to any disclaimer, the term of this patent is extended or adjusted under 35 U.S.C. 154(b) by 3442 days.

This patent is subject to a terminal disclaimer.

(21) Appl. No.: 10/795,779

(22) Filed: Mar. 8, 2004

Related U.S. Application Data

(63) Continuation-in-part of application No. 09/841,079, filed on Apr. 25, 2001, now Pat. No. 7,103,235.

(51) Int. Cl.
G06K 9/40 (2006.01)

(52) U.S. Cl.
USPC .......... 382/254; 356/5.01; 382/103; 382/154; 382/300

(58) Field of Classification Search
USPC ......... 382/103, 106, 151, 154, 209, 274, 275, 382/294
See application file for complete search history.

(56) References Cited

U.S. PATENT DOCUMENTS

| 4,716,414 | A | * | 12/1987 | Luttrell et al. | 342/179 |
|---|---|---|---|---|---|
| 4,768,156 | A | * | 8/1988 | Whitehouse et al. | 382/279 |
| 4,965,840 | A | * | 10/1990 | Subbarao | 382/106 |
| 4,973,111 | A | * | 11/1990 | Haacke et al. | 324/309 |
| 5,031,154 | A | * | 7/1991 | Watanabe | 367/8 |
| 5,140,416 | A | * | 8/1992 | Tinkler | 348/33 |
| 5,142,659 | A | * | 8/1992 | Rao et al. | 382/106 |
| 5,200,606 | A | | 4/1993 | Krasutsky et al. | 250/216 |
| 5,224,109 | A | | 6/1993 | Krasutsky et al. | 372/29 |
| 5,235,513 | A | * | 8/1993 | Velger et al. | 701/16 |
| 5,361,763 | A | * | 11/1994 | Kao et al. | 600/410 |
| 5,384,573 | A | * | 1/1995 | Turpin | 342/179 |
| 5,424,823 | A | | 6/1995 | Nettles et al. | 356/5.01 |
| 5,430,806 | A | * | 7/1995 | Nettles | 382/295 |
| 5,509,090 | A | | 4/1996 | Maruyama et al. | 382/276 |
| 5,568,384 | A | * | 10/1996 | Robb et al. | 715/202 |
| 5,608,514 | A | * | 3/1997 | Stann et al. | 356/5.09 |
| 5,638,164 | A | * | 6/1997 | Landau | 356/5.01 |
| 5,644,386 | A | * | 7/1997 | Jenkins et al. | 356/4.01 |
| 5,654,820 | A | * | 8/1997 | Lu et al. | 359/298 |
| 5,657,402 | A | * | 8/1997 | Bender et al. | 382/284 |
| 5,682,225 | A | * | 10/1997 | DuBois et al. | 356/73 |
| 5,721,427 | A | * | 2/1998 | White et al. | 250/252.1 |
| 5,767,987 | A | * | 6/1998 | Wolff et al. | 358/447 |

(Continued)

OTHER PUBLICATIONS

{Simon Baker and Takeo Kanade}, {Limits on super-resolution and how to break them},2002, {IEEE Transactions on Pattern Analysis and Machine Intelligence}, vol. 24, p. {1167-1183}.*

(Continued)

*Primary Examiner* — Gandhi Thirugnanam
(74) *Attorney, Agent, or Firm* — Withrow & Terranova, PLLC

(57) ABSTRACT

A method and apparatus for enhancing the resolution of three-dimensional imagery data are disclosed. The method includes registering a frame of the three-dimensional imagery data with a template frame; and temporally averaging the registered frame with the template frame. The apparatus includes a program storage medium encoded with instructions that, when executed by a computing apparatus, performs the method and an apparatus programmed to perform the method.

32 Claims, 11 Drawing Sheets

(56) References Cited

U.S. PATENT DOCUMENTS

| | | | |
|---|---|---|---|
| 5,774,357 A * | 6/1998 | Hoffberg et al. | 713/600 |
| 5,801,678 A | 9/1998 | Huang et al. | 345/127 |
| 5,852,492 A * | 12/1998 | Nimblett et al. | 356/5.04 |
| 5,872,626 A * | 2/1999 | Lipscomb | 356/141.3 |
| 5,893,085 A * | 4/1999 | Phillips et al. | 706/52 |
| 5,898,483 A | 4/1999 | Flowers | 356/4.01 |
| 5,923,789 A * | 7/1999 | Avinash | 382/276 |
| 5,937,094 A * | 8/1999 | Nagasawa | 382/232 |
| 5,963,664 A * | 10/1999 | Kumar et al. | 382/154 |
| 5,988,862 A * | 11/1999 | Kacyra et al. | 703/6 |
| 5,999,662 A * | 12/1999 | Burt et al. | 382/284 |
| 6,112,112 A * | 8/2000 | Gilhuijs et al. | 600/425 |
| 6,115,113 A * | 9/2000 | Flockencier | 356/5.01 |
| 6,198,852 B1 * | 3/2001 | Anandan et al. | 382/284 |
| 6,208,765 B1 * | 3/2001 | Bergen | 382/268 |
| 6,246,898 B1 * | 6/2001 | Vesely et al. | 600/424 |
| 6,266,453 B1 * | 7/2001 | Hibbard et al. | 382/294 |
| 6,272,448 B1 * | 8/2001 | Ishii | 703/2 |
| 6,307,959 B1 * | 10/2001 | Mandelbaum et al. | 382/154 |
| 6,323,941 B1 | 11/2001 | Evans et al. | 356/4.01 |
| 6,330,523 B1 * | 12/2001 | Kacyra et al. | 702/159 |
| 6,359,681 B1 | 3/2002 | Housand et al. | 356/4.01 |
| 6,366,797 B1 * | 4/2002 | Fisher et al. | 600/410 |
| 6,377,833 B1 * | 4/2002 | Albert | 600/410 |
| 6,434,280 B1 * | 8/2002 | Peleg et al. | 382/299 |
| 6,614,917 B1 | 9/2003 | Phillips | 382/103 |
| 6,739,511 B2 * | 5/2004 | Tsikos et al. | 235/462.01 |
| 6,900,884 B2 | 5/2005 | Alderson et al. | 356/124.5 |
| 6,901,173 B2 | 5/2005 | Alderson et al. | 382/312 |
| 6,973,218 B2 | 12/2005 | Alderson et al. | 382/260 |
| 7,016,550 B2 | 3/2006 | Alderson et al. | 382/274 |
| 7,085,323 B2 * | 8/2006 | Hong | 375/240.25 |
| 7,103,235 B2 | 9/2006 | Tener et al. | 382/294 |
| 7,194,119 B2 * | 3/2007 | Zahlmann et al. | 382/128 |
| 7,283,658 B2 * | 10/2007 | Maruya | 382/144 |
| 7,551,771 B2 * | 6/2009 | England, III | 382/154 |
| 7,593,597 B2 * | 9/2009 | Palum et al. | 382/278 |
| 7,679,751 B1 * | 3/2010 | Kablotsky | 356/445 |
| 7,697,748 B2 * | 4/2010 | Dimsdale et al. | 382/154 |
| 2001/0017651 A1 * | 8/2001 | Baker et al. | 348/169 |
| 2002/0012472 A1 * | 1/2002 | Waterfall et al. | 382/245 |
| 2002/0061131 A1 * | 5/2002 | Sawhney et al. | 382/154 |
| 2002/0122576 A1 * | 9/2002 | Weese et al. | 382/131 |
| 2002/0159101 A1 | 10/2002 | Alderson et al. | 358/504 |
| 2002/0159648 A1 | 10/2002 | Alderson et al. | 382/260 |
| 2002/0159651 A1 * | 10/2002 | Tener et al. | 382/266 |
| 2003/0016882 A1 * | 1/2003 | Riley et al. | 382/275 |
| 2003/0019933 A1 * | 1/2003 | Tsikos et al. | 235/454 |
| 2003/0067595 A1 | 4/2003 | Alderson et al. | 356/124.5 |
| 2003/0198400 A1 | 10/2003 | Alderson et al. | 382/274 |
| 2004/0096125 A1 | 5/2004 | Alderson et al. | 382/312 |
| 2005/0041842 A1 * | 2/2005 | Frakes et al. | 382/128 |
| 2005/0068517 A1 * | 3/2005 | Evans et al. | 356/5.01 |
| 2005/0280714 A1 * | 12/2005 | Freeman | 348/219.1 |
| 2006/0006309 A1 * | 1/2006 | Dimsdale et al. | 250/206.1 |
| 2006/0013443 A1 * | 1/2006 | McDowall et al. | 382/109 |
| 2006/0188169 A1 | 8/2006 | Tener et al. | 382/254 |
| 2006/0269155 A1 * | 11/2006 | Tener et al. | 382/243 |
| 2007/0081709 A1 * | 4/2007 | Warmath et al. | 382/128 |

OTHER PUBLICATIONS

Simon Baker, Takeo Kanade, "Limits on Super-Resolution and How to Break Them,", 2000, IEEE Computer Society Conference on Computer Vision and Pattern Recognition (CVPR'00)—vol. 2, p. 1-8.*

Gavin Rosenbusha, Tsai Hongb, and Roger D. Eastman, Super-Resolution Enhancement of Flash LADAR Range Data, 2007, Proc. of SPIE vol. 6736, p. 1-10.*

Mahmoud, Hesham, "Multi-Look Model Based Target Recognition in Pulsed Ladar Imagery", Aug. 1999, Center for Automation Research University of Maryland, p. 1-37.*

{Michel Irani. Shmuel Peleg}, {Super Resolution From Image Sequences}, {1990}, p. 115-120.*

* cited by examiner

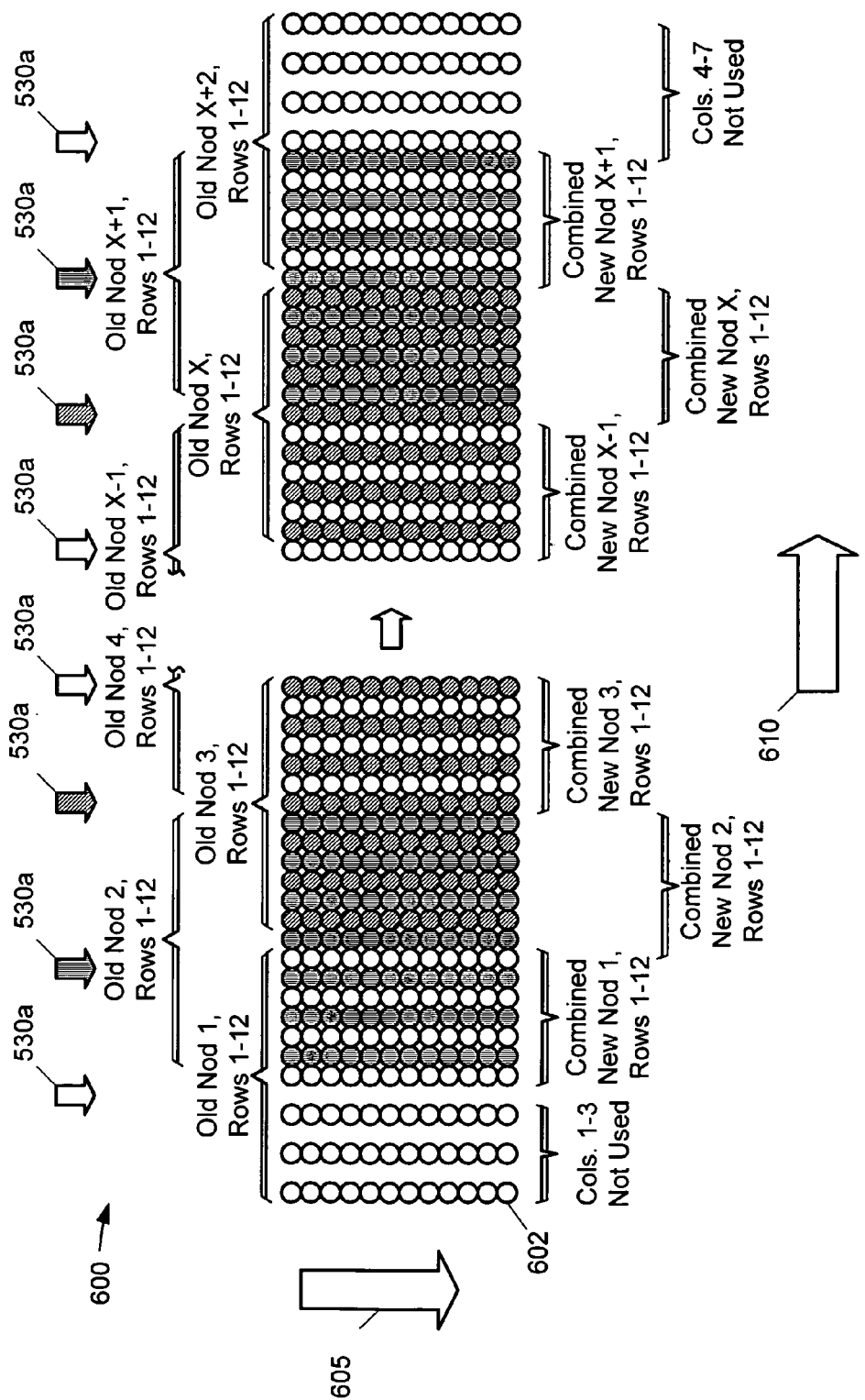

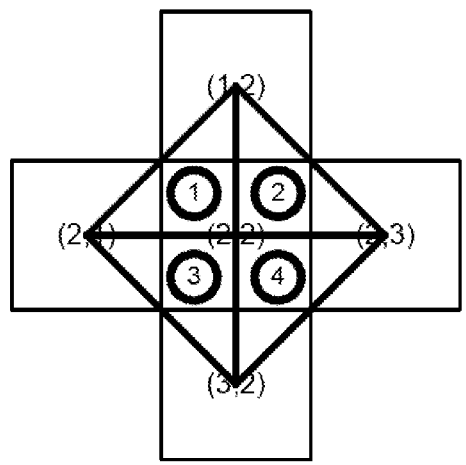
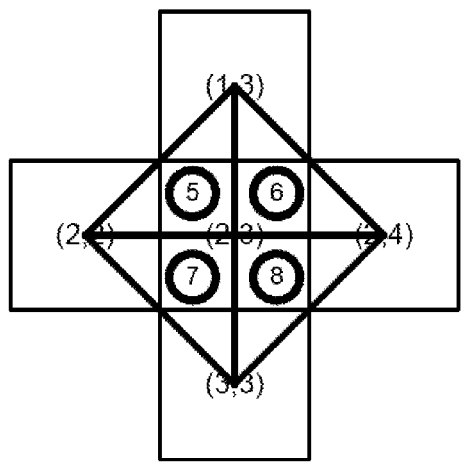
Fig. 9A        Fig. 9B
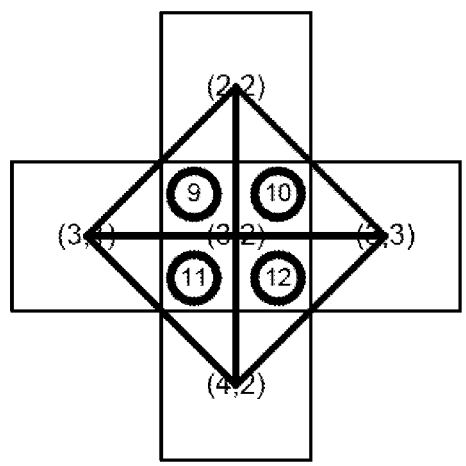
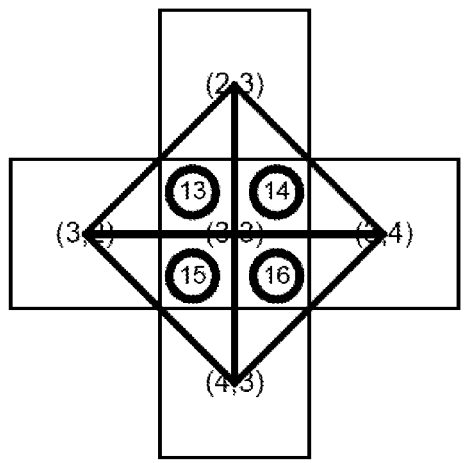
Fig. 9C        Fig. 9D

METHOD AND APPARATUS FOR ENHANCING THREE-DIMENSIONAL IMAGERY DATA

This is a continuation-in-part of U.S. application Ser. No. 09/841,079, filed Apr. 25, 2001, entitled "Extended Range Image Processing for Electro-Optical Systems," in the name of Gene D. Tener, et al., issued Sep. 5, 2006, as U.S. Letters Pat. No. 7,103,235, and commonly assigned herewith.

BACKGROUND OF THE INVENTION

1. Field of the Invention

The present invention pertains to three-dimensional imagery, and, more particularly, to a method and apparatus for enhancing resolution of three-dimensional imagery.

2. Description of the Related Art

A need of great importance in military and some civilian operations is the ability to quickly detect and identify objects, frequently referred to as "targets," in a "field of view." A common problem in military operations, for example, is to detect and identify targets, such as tanks, vehicles, guns, and similar items, which have been camouflaged or which are operating at night or in foggy weather. It is important in many instances to be able to distinguish reliably between enemy and friendly forces. As the pace of battlefield operations increases, so does the need for quick and accurate identification of potential targets as friend or foe, and as a target or not.

Techniques for identifying targets have existed for many years. For instance, in World War II, the British developed and utilized radio detection and ranging ("RADAR") systems for identifying the incoming planes of the German Luftwaffe. RADAR uses radio waves to locate objects at great distances even in bad weather or in total darkness. Sound navigation and ranging ("SONAR") has found similar utility and application in environments where signals propagate through water, as opposed to the atmosphere. While RADAR and SONAR have proven quite effective in many areas, they are inherently limited by a number of factors. For instance, RADAR is limited because of its use of radio frequency signals and the size of the resultant antennas used to transmit and receive such signals. Sonar suffers similar types of limitations. Thus, alternative technologies have been developed and deployed.

One such alternative technology is laser detection and ranging ("LADAR"). Similar to RADAR systems, which transmit radio waves and receive radio waves reflected from objects, LADAR systems transmit laser beams and receive reflections from targets. Because of the short wavelengths associated with laser beam transmissions, LADAR data exhibits much greater spatial resolution than RADAR data.

LADAR systems are therefore useful in many applications for locating and identifying objects including, in military environments, automatic target recognition ("ATR") systems. The resolution of data obtained from such a LADAR system is impacted by several design trade-offs including how many pixels are needed on target to provide the ATR system with enough information to autonomously identify targets. Other factors include the scan angles (which define the sensor field of view), the range, the range accuracy, and the range resolution of the system. The LADAR range is influenced by the laser power, the telescope collection aperture, and the detector response. The range accuracy is influenced by the sampling rate and convolution step size of the pulse capture electronics. The range resolution is influenced by the receiver bandwidth, laser pulse width, and the sampling rate of the pulse capture electronics.

A practical LADAR system design is based upon balancing several of these conflicting parameters. An ideal LADAR system would have high angular resolution, large scan angles (field of view), long range, a high range accuracy, and fine range resolution. The resulting LADAR system would be very expensive. High angular resolution implies that the angular spacing between pixels, i.e., reflected beamlets, is very small, which results in many more pixels on the target of interest making it easier to "see." The larger the scan angles, the larger the area that can be searched for targets. The longer the range capability of the LADAR, the sooner the target can be found and the threat determined. Range accuracy is defined as how small of a range change can be resolved by the LADAR. Range resolution is defined as how close two laser returns can be spaced and still resolved. The cost of the system is also frequently a major driver in the design. Each of these parameters is traded against each other to get a system with acceptable performance characteristics for the particular application.

However, object identification requirements for three-dimensional sensors are becoming more demanding. This drives up the range accuracy, range resolution, and spatial resolution requirements for LADAR systems. This, in turn, drives up system costs by requiring higher tolerance components and application specific laser transmitters.

One alternative for enhancing the resolution of three-dimensional data is disclosed in U.S. Letters Pat. No. 5,898,483, entitled "Method for Increasing LADAR Resolution," issued Apr. 27, 1999, to Lockheed Martin Corporation as assignee of the inventor Edward Max Flowers. The '483 patent discloses a technique wherein the LADAR data is generated from a split beam laser signal transmitted at a given elevation scan rate and a given azimuth scan rate, and the elevation scan rate by which the laser signal is transmitted is reduced by a first predetermined factor and azimuth scan rate by a second predetermined factor, wherein both of the factors are integers greater than 1. Although this technique mitigates some of the aforementioned problems, it requires increased hardware performance by the system. Furthermore, this technique only provides for a 2× spatial resolution increase and does not improve range accuracy or range resolution.

The present invention is directed to resolving, or at least reducing, one or all of the problems mentioned above.

SUMMARY OF THE INVENTION

The invention includes a method and apparatus for enhancing the resolution of three-dimensional imagery data. The method comprises registering a frame of the three-dimensional imagery data with a template frame; and temporally averaging the registered frame with the template frame. The apparatus includes a program storage medium encoded with instructions that, when executed by a computing apparatus, performs the method and an apparatus programmed to perform the method.

BRIEF DESCRIPTION OF THE DRAWINGS

The invention may be understood by reference to the following description taken in conjunction with the accompanying drawings, in which like reference numerals identify like elements, and in which:

FIG. 6A and FIG. 6B depict alternative LADAR data sets acquired by the platform in the embodiment of FIG. 5A-FIG. 5B;

FIG. 8 and FIG. 9A-FIG. 9D illustrate an auxiliary resolution enhancement technique applied in the embodiment of FIG. 7A-FIG. 7B.

Figure 1:
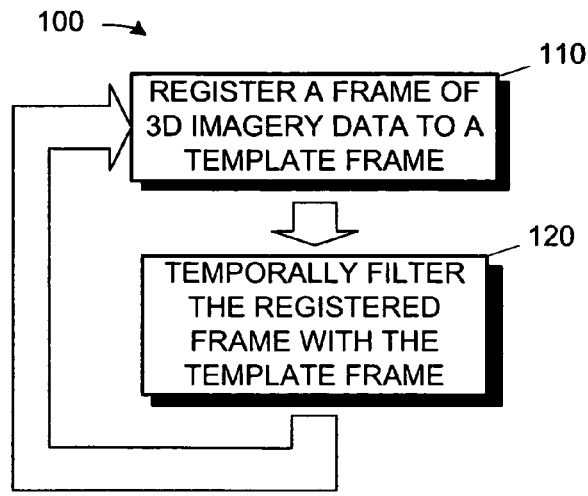
FIG. 1 illustrates one particular embodiment of the present invention.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The present invention is a method and apparatus for enhancing 3D imagery data resolution. More particularly, the invention provides a multi-frame processing technique that improves the signal-to-noise performance, range accuracy, range resolution, and spatial resolution. In one particular embodiment, the 3D imagery data is part of a data set also including two-dimensional ("2D") data that similarly benefits from the application of the invention thereto. In this particular embodiment, disclosed more fully below, the invention is employed in an ATR system, although the invention is not so limited.

In general, just as the 2D data comprises a plurality of picture elements ("pixels"), the 3D imagery data comprises a plurality of volume elements, or "voxels." Whereas a pixel describes a point in two-dimensions ($\Theta_a$, $\Theta_e$), a voxel describes a point in three-dimensions (x, y, z). A voxel in the 3D imagery data is either a "surface" voxel (i.e., defines a point of reflection on the surface of an object), an "empty" voxel (i.e., defines a point between the sensor and the reflecting surface from which no reflection is returned), or an "undecided" voxel (i.e., defines a point behind the reflecting surface from which no reflection is returned). In the illustrated embodiment, each surface voxel will also have an intensity value associated with it that defines the intensity of the energy reflected from the surface.

The 3D imagery data can be acquired by any remote sensing technology known in the art. Suitable technologies include LADAR and stereo imaging, but other well known techniques may be employed. In general, the 3D imagery data is generated and captured, or stored, for acquisition. However, not all embodiments will capture the 3D imagery data in acquisition. The acquired 3D imagery data is typically processed in groups of voxels referred to as "frames" of data. The present invention processes the acquired 3D imagery data on a frame-by-frame basis.

In general, as is illustrated in FIG. 1, the present invention iterates through a process 100 in which it registers each frame of a three-dimensional ("3D") image to a template frame (at 110) and then temporally filters the registered frame (at 120). The filtered, correlated frame exhibits an enhanced resolution in the three-dimensional image relative to the same frame prior to the correlation and filtering. Typically, the template frame is a temporally filtered frame from a previous iteration. The temporally filtered frame of the current iteration may also be used to periodically update or replace the template frame.

Figure 2B:
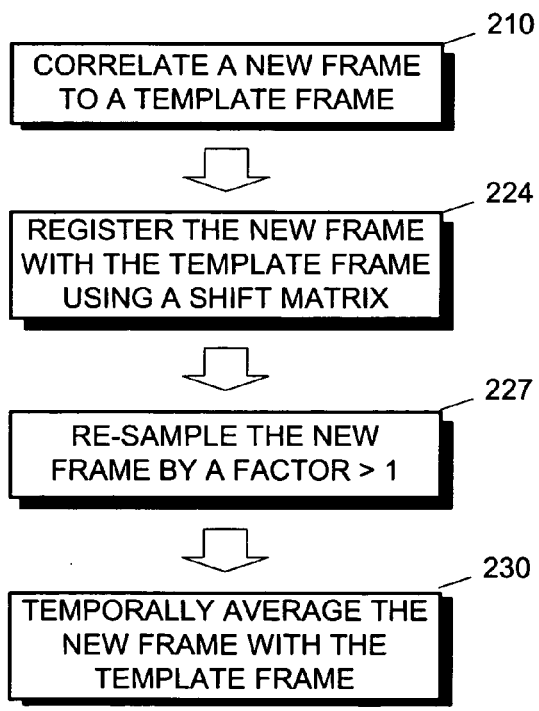
FIG. 2A-FIG. 2C illustrate one particular embodiment of a technique for enhancing the resolution of LADAR data in accordance with the present invention.
Figure 2A:
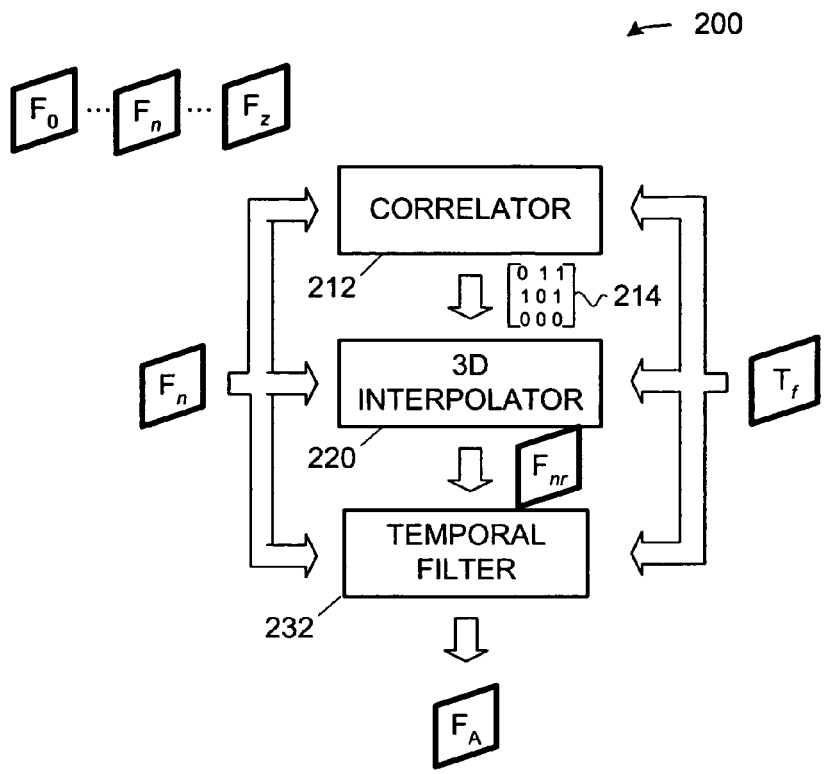
Figure 2C:
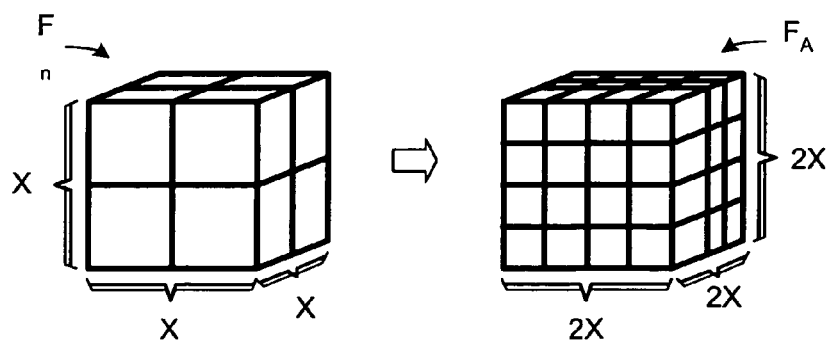

FIG. 2A-FIG. 2C illustrate one particular implementation 200 of a technique for enhancing 3D imagery data in accordance with the present invention. Many of the elements of FIG. 2A represent functional blocks of code in a computer program. Thus, this particular embodiment of the present invention is largely software implemented. Some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk, read only memory ("ROM"), or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Returning to the drawings, once acquired, a new frame $F_n$, shown in FIG. 2A, of a 3D imagery data set comprising a plurality of frames $F_0$-$F_z$ is correlated (at 210, in FIG. 2B) to a template frame $T_f$. FIG. 2C conceptually illustrates the new frame $F_n$ having a resolution of X in all three dimensions (x, y, z). Note that there is no requirement that the resolution in all, or even any two, dimensions be equal and may vary in alternative embodiments. The correlation (at 210) is performed by a 3D data correlator 212. Image correlation stabilizes the new frame $F_n$ and assists in the correction of any line of sight ("LOS") deviations between the template frame $T_f$ and the new frame $F_n$. Thus, the 3D data correlator 212 ensures that the new frame $F_n$ and the template frame $T_f$ can aligned, or "registered" to within a fraction of a voxel. The correlation may be performed by, for example, minimizing root mean square ("RMS") surface error using 3-D translation and 3-D rotation techniques. A recursive filter (not shown) can be used to integrate intensity and range. The output of the correlation (at 210) by the 3D data correlator 212 is a shift matrix 214 quantifying any shift between the new frame $F_n$ and the template frame $T_f$.

The implementation 200 then registers (at 224) the new frame $F_n$ with the template frame $T_f$ by application of the shift matrix 214. The shift matrix 214, when applied, aligns the new frame $F_n$ with the template frame $T_f$. In the illustrated embodiment, a 3D interpolator 220 performs a sub-voxel interpolation. Sub-voxel interpolations of this sort are known to the art, and any suitable technique may be used. The sub-voxel interpolation is performed to find the true centroid of the target in the new frame $F_n$. The output of the 3D interpolator 220 is an output sample lattice, which may be considered the registered frame $F_{nr}$ in this particular embodiment.

In addition, the 3D interpolator 220 re-samples (e.g., over-samples) (at 227) at least a portion of the new frame $F_n$ by a factor of greater than one, or by any desired amount, to generate the registered frame $F_{nr}$. As a result of re-sampling by a factor of two, for example, the registered frame $F_{nr}$ will contain at least double the number of samples of the new frame $F_n$ for the portion of the new frame $F_n$ which has been re-sampled. Thus, in the illustrated embodiment, the 3D interpolator 220 registers the new frame $F_n$ with the template frame T by interpolating the new frame $F_n$ using the shift matrix 214, and re-samples (e.g., over-samples) at least a portion of the new frame $F_n$.

The new frame $F_n$ can thus be shifted so that the center of the field of view of the new frame $F_n$ is aligned with the center of the field of view of the template frame $T_f$. In an exemplary embodiment of the present invention, 3D interpolation is used to resample and shift the second frame. Those of ordinary skill in the art will appreciate that other forms of interpolation that perform image re-sampling and shifting can also be used, such as cubic interpolation, spline interpolation, or fractal interpolation. As a result of interpolation, image shift due to line-of-sight ("LOS") stabilization errors or a small commanded LOS drift can provide over-sampling of a target image in addition to fixed pattern noise averaging (or intensity variations due to laser power fluctuations) over several pixels. A suitable technique disclosed and claimed in U.S. Letters Pat. No. 5,682,225, entitled "Ladar Intensity Image Correction for Laser Output Variations", and issued Oct. 28, 1997, to Loral Vought Systems Corp. as assignee of the inventors David S. DuBois, et al., and commonly assigned herewith The implementation 200 then temporally averages (at 230) the registered new frame $F_{nr}$ with the template frame $T_f$ in the temporal filter 232. More particularly, the temporal filter 232 averages the registered new frame $F_{nr}$ with the template frame $T_f$. Since the template frame is the product of a previous iteration, the averaging performed by the temporal filter 232 effectively averages over time, i.e., temporally. This produces an "averaged" frame $F_A$ populated with an enhanced resolution that improves three-dimensional spatial resolution, range accuracy, and range resolution. As is conceptually illustrated in FIG. 2C, the averaged frame $F_A$ has twice the resolution of the new frame $F_n$ if the new frame $F_n$ was re-sampled by a factor of 2. The averaged frame $F_A$ exhibits improved range performance through reduction in the Signal-to-Noise Ratio ("SNR"), improved range accuracy, and enhanced range resolution relative to the new frame $F_n$.

The template frame $T_f$, shown in FIG. 2A, can be selected in a number of ways. For instance, the averaged frame $F_A$ may be adopted as the template frame $T_f$ for the next iteration of the process on the next new frame $F_{n+1}$. However, in the illustrated embodiment, the first frame $F_n$ in a series $F_0$-$F_z$ thereof, i.e., $F_0$, is oversampled in the depth interpolator 220 and adopted as the template frame $T_f$ for subsequent iterations for the frames $F_1$-$F_z$. However, still other techniques for selecting the initial template frame $T_f$ may be employed in other embodiments. For example, several frames of data (e.g., several of the frames $F_0$-$F_z$) may be temporally filtered and then decimated to the original, single frame sample lattice to form the template frame $T_f$. Alternatively, for example, any one of the frames $F_0$-$F_z$ (e.g., the frame $F_0$) can become the template frame $T_f$ without any processing (e.g., no temporal filtering). Still other techniques may be employed.

The template frame $T_f$ may become stale over time such that updating or replacing the template frame $T_f$ may be desirable. The current template frame $T_f$ may be discarded and the next subsequent frame in the series $F_0$-$F_z$ may be adopted as the new template frame $T_f$ in the same manner that an earlier frame (e.g., $F_0$) was adopted as the current template frame $T_f$. This type of replacement may be performed periodically at known intervals or upon detection of a changed perspective. Alternatively, the template frame $T_f$ may be updated from the down-sampled output of the temporal filter 232 (i.e., the averaged frame $F_A$). Updating in this manner can occur, for example, every four frames, since continuous updating can result in a filtered template that can be blurred and shifted. Still further, the most recent averaged frame $F_A$ can be adopted as a new template frame $T_f$ to replace the current template frame $T_f$.

Thus, the benefits of the present invention to the image fidelity are improved surface spatial resolution (x, y, z) and higher SNR for both the range (through multiple samples that the probability of getting a range value 1 out of N times is good) and the intensity values (through multiple sample integration) at the surface. For instance, assume that 0.2-meter voxel resolution is needed to identify an object such as a tank, truck, or any other small vehicle. Assume also that the acquisition system is at long range and only has sufficient so range accuracy and sampling to achieve 0.8-meter voxel resolution in a single frame. The first frame (e.g., the frame $F_0$ in FIG. 2A) arrives and becomes the template frame $T_f$. In addition, 3-D surface interpolation is performed to populate a 0.2-meter voxel lattice with the best estimate of surface location and intensity. Interpolation is achieved by rendering the coarse voxel data (0.8-meter grid) at the fine lattice points (0.2-meter grid) and interpolating the intensity values from the coarse voxel grid to the fine voxel grid. At this point, the fine grid is populated with surface voxels, empty voxels, and undecided voxels.

Next, the second frame of data (e.g., the frame $F_1$ in FIG. 2A) is collected and iteratively interpolated to the template frame $T_f$ coordinate system using 3-D translation and 3-D rotation. The process is iterative and measures the translation vector and rotation angles that achieve minimum RMS surface error between the present frame (i.e., the frame $F_n$ in FIG. 2A) and the template for overlapping pixels. Note that surface intensity can also be used in the correlation process, or alternatively, a weighted combination of surface RMS error and intensity can be used to achieve the "best" correlation.

Once the 3-D translation and rotation values are determined, the present frame (i.e., the frame $F_n$ in FIG. 2A) can be interpolated spatially, and in intensity, to the same 0.2-meter fine sample lattice as the previous frame (i.e., the frame $F_{n-1}$). Now that the two frames are correlated to the same grid, voxel and intensity averaging can be employed to improve range resolution and temporally integrate intensity variations between frames. Range resolution can be maintained by storing fractional range values along with the voxel surface (x, y, z) grid locations. Initially, the voxel dimension surface grid may move between grid points, but over time the surface location of each grid point will integrate to the "true" surface voxel as more and more frames are processed.

Figure 7A:
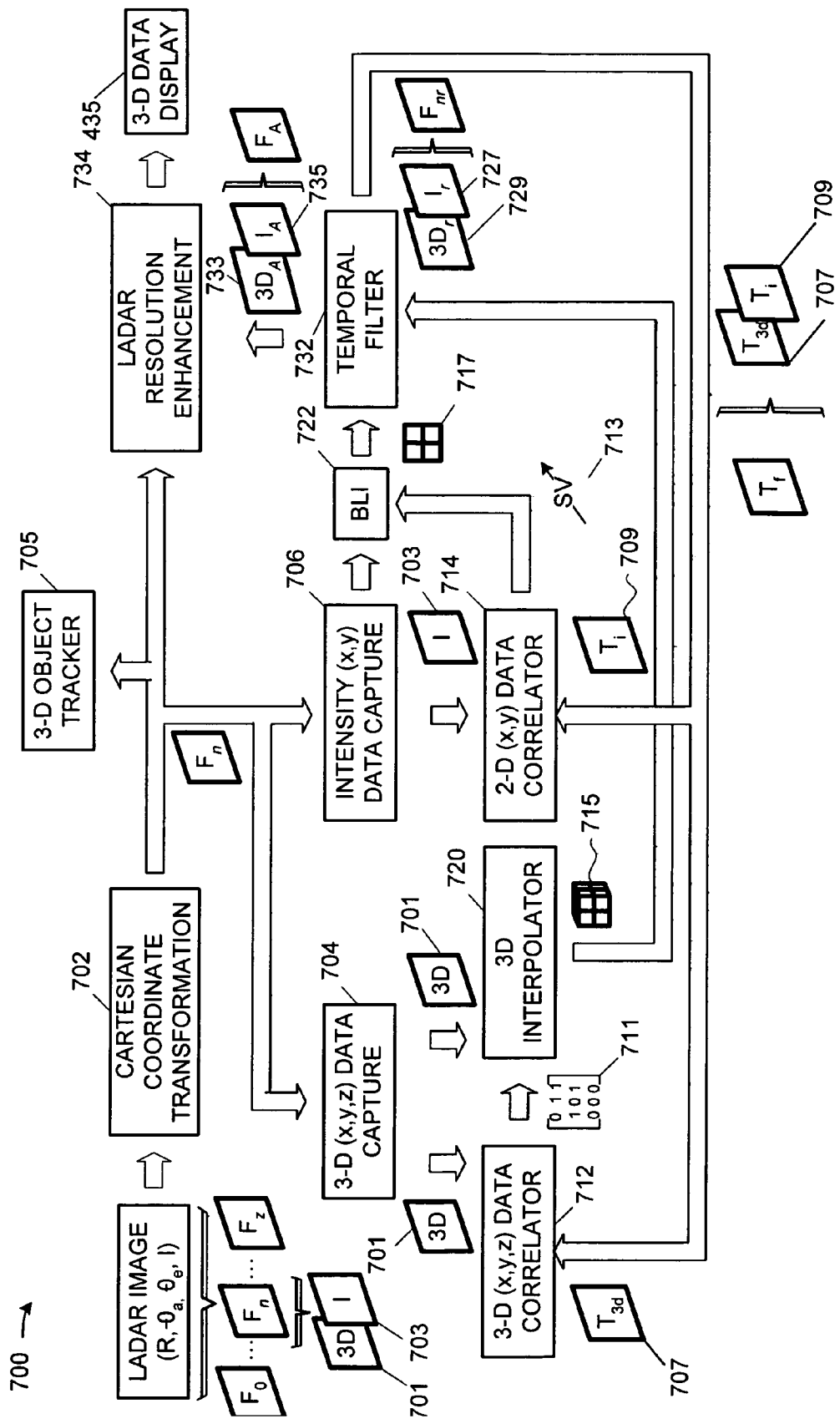
FIG. 7A and FIG. 7B illustrate one particular embodiment of a technique for enhancing the resolution of the LADAR data set acquired in FIG. 4-FIG. 6A in accordance with the present invention.
Figure 7B:
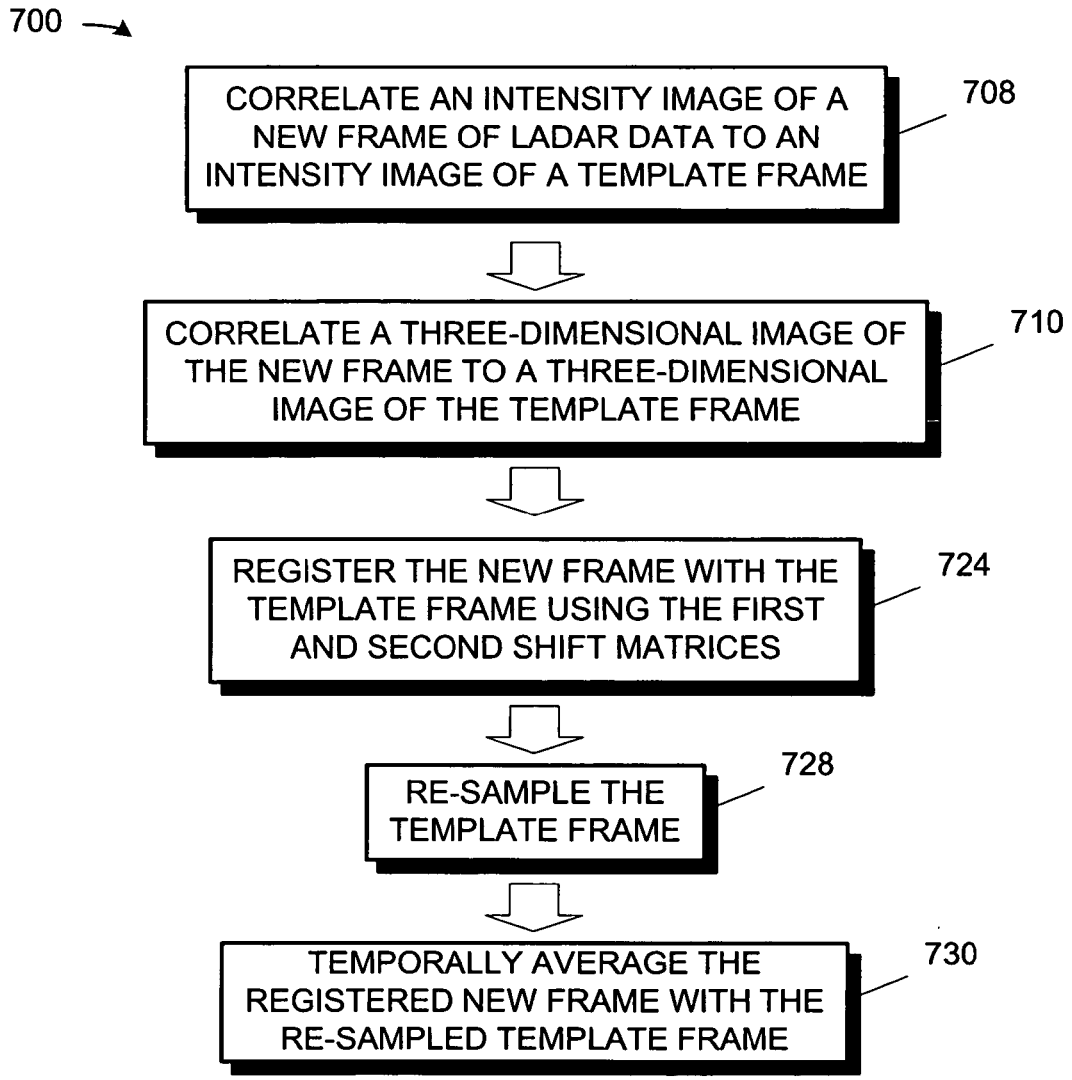

The enhanced 3D imagery data may be put to any number of uses. One use, in an automatic target recognition ("ATR") system, is described immediately below with respect to FIG. 3. In this particular embodiment, the original set of 3D imagery data is acquired through a LADAR system as illustrated and described in greater detail below in reference to FIG. 4-FIG. 5B and is processed as illustrated in FIG. 7A-FIG. 7B for use in an ATR system. The invention is applied as part of that processing to enhance the original 3D imagery data.

Figure 3:
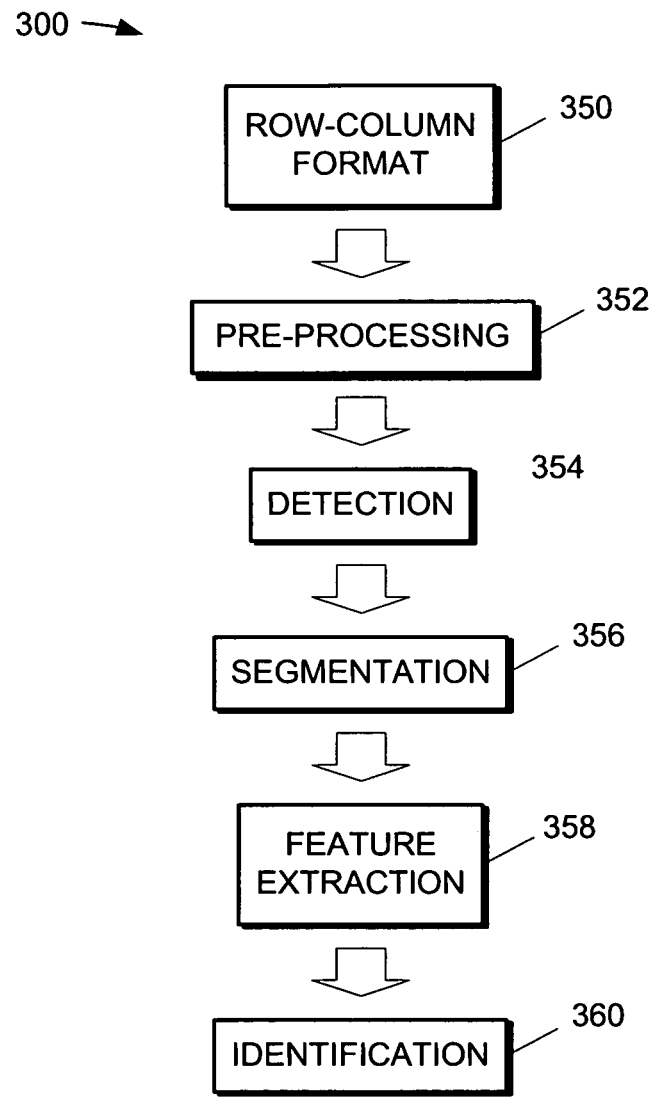
FIG. 3 depicts the handling of three-dimensional data acquired in the scenario in FIG. 4 and FIG. 5A-FIG. 5B as employed in an automatic target recognition system.

FIG. 3 illustrates the handling of a set of LADAR data in an ATR system. As those in the art having the benefit of this disclosure will appreciate, LADAR is one remote sensing technology in which the acquired data includes 3D imagery data. The LADAR data is captured in row column format (at 350) and processed by a processor or some other computing device such as a personal computer, a mini-computer, or other suitable computing device. This processing generally involves pre-processing (at 352), detection (at 354), segmentation (at 356), feature extraction (at 358), and identification (at 360).

Generally, the pre-processing (at 352) is directed to minimizing noise effects, such as identifying so-called intensity dropouts in the converted three-dimensional image, where the range value of the LADAR data is set to zero. Noise in the converted three-dimensional LADAR data introduced by low SNR conditions is processed so that performance of the overall system is not degraded. In this regard, the LADAR data is used so that absolute range measurement distortion is minimized, edge preservation is maximized, and preservation of texture step (that results from actual structure in objects being imaged) is maximized. The pre-processing (at 352) also temporally filters the LADAR data in accordance with the present invention, i.e., utilizing the process 100 illustrated in FIG. 1, as will be discussed further below.

In general, in one particular embodiment, detection (at 354) identifies specific regions of interest in the pre-processed LADAR data. The detection (at 354) uses range cluster scores as a measure to locate flat, vertical surfaces in an image. More specifically, a range cluster score is computed at each pixel to determine if the pixel lies on a flat, vertical surface. The flatness of a particular surface is determined by looking at how many pixels are within a given range in a small region of interest. The given range is defined by a threshold value that can be adjusted to vary performance. For example, if a computed range cluster score exceeds a specified threshold value, the corresponding pixel is marked as a detection. If a corresponding group of pixels meets a specified size criterion, the group of pixels is referred to as a region of interest. Regions of interest, for example those regions containing one or more targets, are determined and passed to a segmenter for further processing.

This detection technique is described more fully in U.S. Letters Pat. No. 5,424,823, entitled "System for Identifying Flat Orthogonal Objects Using Reflected Energy Signals", and issued Jun. 13, 1995, to Loral Vought Systems Corporation, as assignee of the inventors James L. Nettles, et al., and now commonly assigned herewith. However, a number of detection techniques are well known to the art and may be suitable for implementation in accordance with the present invention. Any of these other, suitable techniques known to the art may be used in alternative embodiments.

Segmentation (at 356) determines, for each detection of a target, which pixels in a region of interest belong to the detected target and which belong to the detected target's background. Segmentation (at 356) identifies possible targets, for example, those whose connected pixels exceed a height threshold above the ground plane. More specifically, the segmentation (at 356) separates target pixels from adjacent ground pixels and the pixels of nearby objects, such as bushes and trees.

Feature extraction (at 358) provides information about a segmentation (at 356) so that the target and its features in that segmentation can be classified. Features include, for example, orientation, length, width, height, radial features, turret features, and moments. The feature extraction (at 358) also typically compensates for errors resulting from segmentation (at 356) and other noise contamination. Feature extraction (at 358) generally determines a target's three-dimensional orientation and size and a target's size. The feature extraction (at 358) also distinguishes between targets and false alarms and between different types of targets.

Identification (at 360) classifies segmentations to contain particular targets, usually in a two-stage process. First, features such as length, width, height, height variance, height skew, height kurtosis, and radial measures are used to initially discard non-target segmentations. The segmentations that survive this step are then matched with true target data stored in a target database. The data in the target database, for example, may include length, width, height, average height, hull height, and turret height to classify a target. The identification (at 360) is performed using known methods for table look-ups and comparisons.

In one particular embodiment, the identification employs the technique more fully disclosed in U.S. Letters Pat. No. 5,893,085, entitled "Dynamic Fuzzy Logic Process for Identifying Objects in Three-Dimensional Data", and issued Apr. 6, 1999, to Lockheed Martin Corporation as the assignee of the inventors Ronald L. Phillips, et al., and commonly assigned herewith. A suitable variation on this technique is also disclosed in U.S. Letters Pat. No. 6,614,917, entitled "Dynamic process for identifying objects in multi-dimensional data", and issued Sep. 2, 2003, to Lockheed Martin Corporation as assignee of the inventor Ronald L. Phillips, commonly assigned herewith. However, alternative techniques are known to the art and any suitable technique may be employed.

Data obtained from the segmentation (at 356), the feature extraction (at 358), and the identification (at 360) may be displayed in one of a variety of user-selectable formats. Typical formats include a three-view commonly used by armed forces to identify targets during combat, a north reference plan view, or a rotated perspective. These display options available to the operator, either local or remote, are based on the three-dimensional nature of the LADAR image. The results of the feature extraction (at 358) provide target information including orientation, length, width and height. The target image can be displayed from any perspective, independent of the sensor perspective, and the operator can select one of the several display formats that utilize the adjustable perspective.

Figure 4:
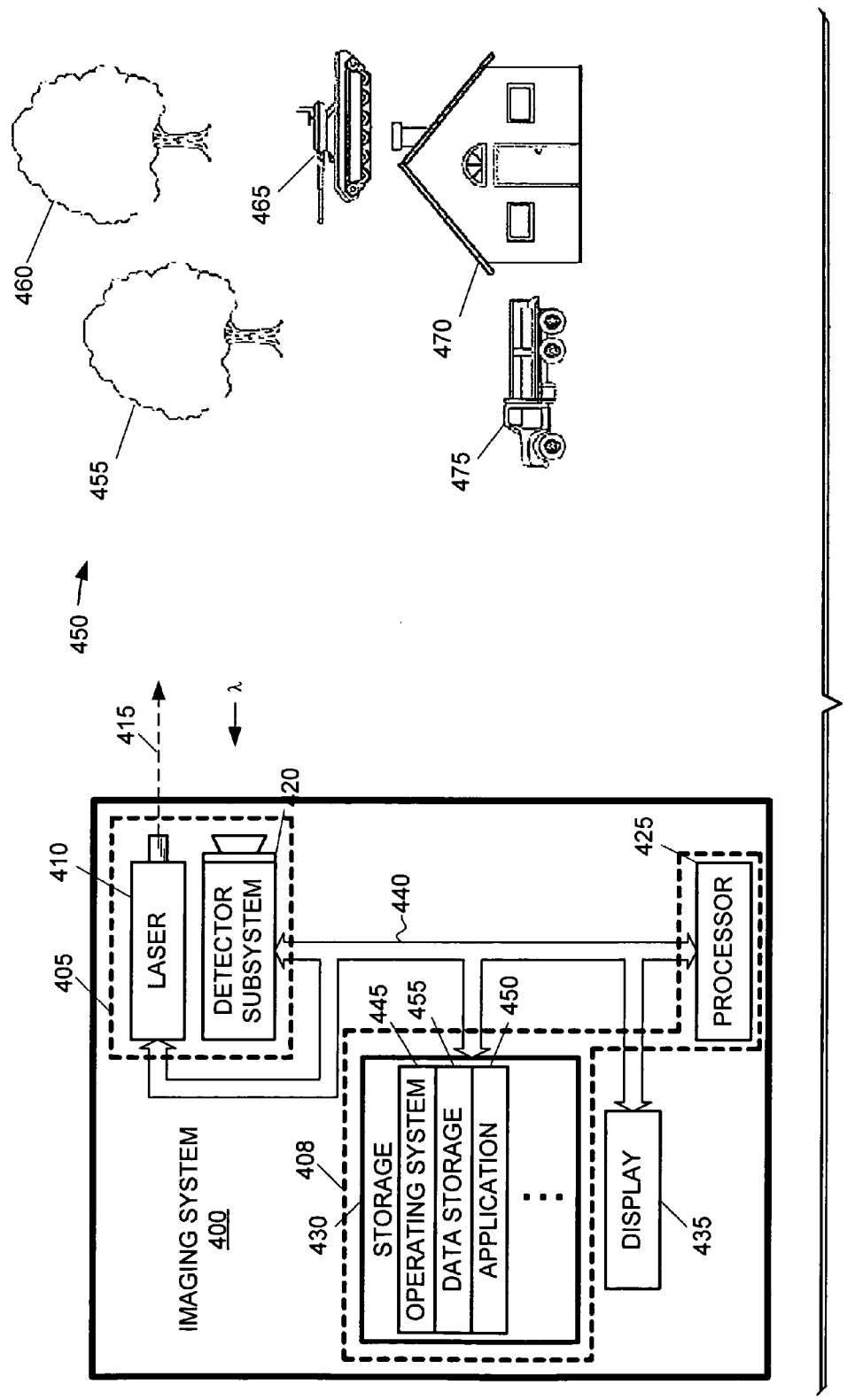
FIG. 4 depicts a system diagram of an imaging system implementing the present invention in a field environment.

The present invention is employed in the pre-processing (at 350, in FIG. 3) of the LADAR data. FIG. 4 illustrates an imaging system 400 constructed and operated in accordance with the present invention in a field environment. The imaging system 400 comprises a data acquisition subsystem 405 and a data processing subsystem 408. In the illustrated embodiment, the data acquisition subsystem 405 includes a laser 410 that produces a laser beam 415 and a detector subsystem 420. The data processing subsystem 408 includes a processor 425, an electronic storage 430, and a display 435 communicating via a bus system 440. In the illustrated embodiment, the processor 425 controls the operation of both the data acquisition subsystem 405 and the data processing subsystem 408. However, the data acquisition subsystem 405 and the data processing subsystem 408 may be under separate control in alternative embodiments.

The processor 425 may any kind of processor, such as, but not limited to, a controller, a digital signal processor ("DSP"), or a multi-purpose microprocessor. The electronic storage 430 may be magnetic (e.g., some type of random access memory, or "RAM", device), but may also be optical in some embodiments. The bus system 440 may employ any suitable protocol known to the art to transmit signals. Similarly, the display 435 may be any suitable display known to the art, for instance, a rack mounted display. Particular implementations of the laser 410, laser beam 415, and detector subsystem 420 are discussed further below.

The processor 425 controls the laser 410 over the bus system 425 and processes data collected by the detector subsystem 420 from an exemplary scene 450 of an outdoor area. The illustrated scene includes trees 456 and 460, a military tank 465, a building 470, and a truck 475. The tree 456, tank 465, and building 470 are located at varying distances from the system 400. Note, however, that the scene 450 may have any composition. One application of the imaging system 400, as shown in FIG. 4, is to detect the presence of the tank 465 within the scene 450 and identify the tank 465. The processor 425 operates under the direction of the operating system 445 and application 450 to fire the laser 410 and process data collected by the detector subsystem 420 and stored in the data storage 455 in a manner more fully described below.

The imaging system 400 produces a LADAR image of the scene 450 by detecting the reflected laser energy to produce a three-dimensional image data set (in spherical coordinates) in which each pixel of the image has both z (range) and intensity data as well as $\Theta_a$ (horizontal) and $\Theta_e$ (vertical) coordinates. The data set is typically converted to Cartesian coordinates (x, y, z) to simplify processing. The LADAR can be implemented using any suitable LADAR transceiver currently known in the art, modified as described below to implement the invention. The operation of one such transceiver 500 is conceptually illustrated in FIG. 5A. The LADAR transceiver 500 includes the laser 410 of FIG. 4 as well as some portions of the detector subassembly 420. In the embodiment illustrated in FIG. 5A, the imaging system 400 is packaged on a platform 510 and collects data from a field of view 525, shown in FIG. 5A, within the scene 450, shown in FIG. 4. In the illustrated embodiment, the field of view 525 comprises a portion of the scene 425 in FIG. 4 containing the tank 465.

The laser signal 415 is transmitted, as represented by the arrow 565, by an optics package (not shown) of the LADAR transceiver 500 on the platform 510 to scan a geographical area called a scan pattern 520. Each scan pattern 520 is generated by scanning elevationally, or vertically, several times while scanning azimuthally, or horizontally, once within the field of view 525 for the platform 510 within the scene 450, shown in FIG. 4.

Figure 5A:
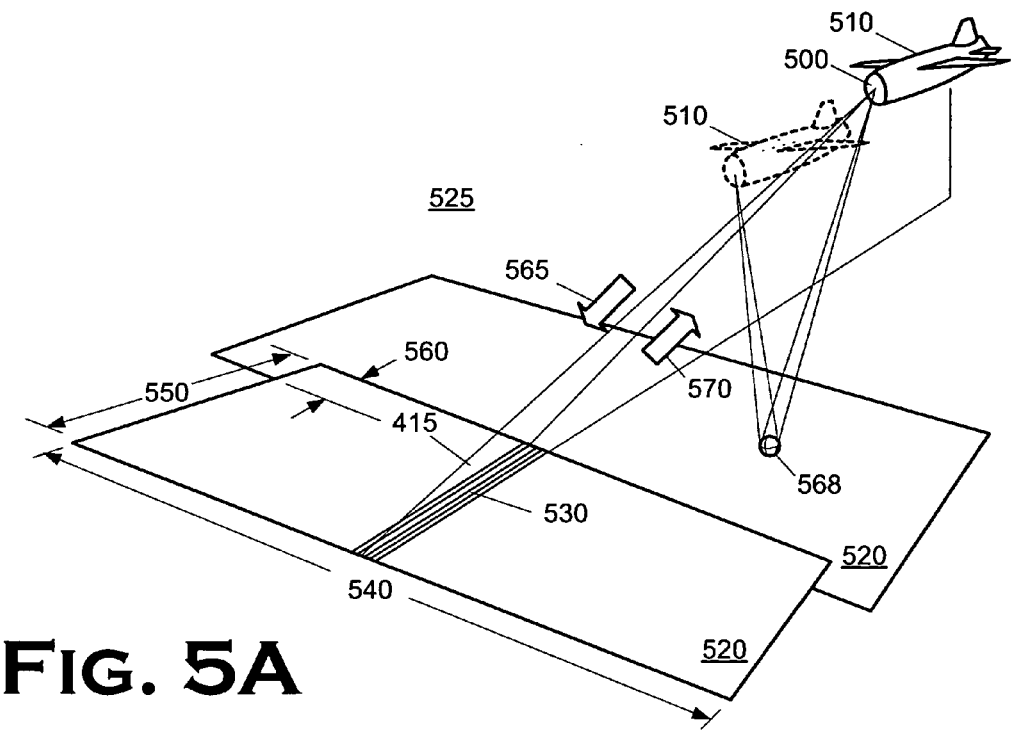
FIG. 5A-FIG. 5B depict one particular embodiment of the system in FIG. 4 constructed and operated in accordance with the present invention to acquire data about a field of view through an optics package aboard a platform shown therein.

FIG. 5A illustrates a single elevational scan 530 during the azimuthal scan 540 for one of the footprints 520, nominally in single pass, search mode. Thus, each footprint 520 is defined by a plurality of elevational scans 550 such as the elevational scan 530 and the azimuthal scan 540. The principal difference between the successive footprints 520 in FIG. 5A is the location of the platform 510 at the start of the scanning process. An overlap 560 between the footprints 520 is determined by the velocity of the platform 510. The velocity, depression angle of the sensor with respect to the horizon, and total azimuth scan angle of the LADAR platform 510 determine the footprint 520 on the ground. In a tracking mode, however, as the platform 510 moves (e.g., from the first position, shown in solid lines, to the second position, shown in broken lines), the LADAR transceiver 500 focuses on an object 568 and begins collecting data from different perspectives.

Figure 5B:
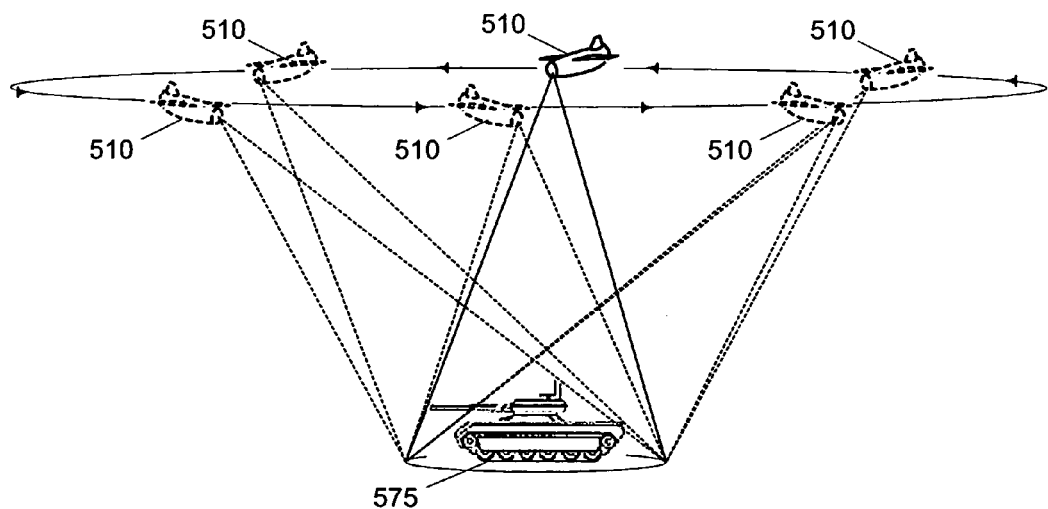

One interesting application of the present invention, illustrated in FIG. 5B, is found where the platform 510 circles a target 575 on the ground. As the platform 510 circles the target 575, different surfaces of the target 575 will become visible and each x, y location will contain a front and back surface. The result will be a complete description of the visible 3-D surface. The intensity image could be presented or intensity combined with shadowing could be developed using a hypothetical sun location to enhance surface detail. Thus, the platform 510 may search for the target 575 as shown in FIG. 5A and, upon identifying the target 575 as an object of interest, circle the target 575, as shown in FIG. 5B, to acquire a more complete data set regarding the target 575.

Referring now to FIG. 5A, the laser signal 415 is typically a pulsed signal and may be either a single beam or a split beam. Because of many inherent performance advantages, split beam laser signals are typically employed by most LADAR systems. A single beam may be split into several beamlets spaced apart from one another by an amount determined by the optics package (not shown) aboard the platform 510 transmitting the laser signal 415. Each pulse of the single beam is split, and so the laser signal 415 transmitted during the elevational scan 550 in FIG. 5A is actually, in the illustrated embodiment, a series of grouped beamlets. The optics package aboard the platform 510 transmits the laser signal 415 while scanning elevationally 550 and azimuthally 540.

The laser signal 415 is continuously reflected back to the platform 510, which receives the reflected laser signal. Suitable mechanisms for use in generation and acquiring LADAR signals are disclosed in:

U.S. Letters Pat. No. 5,200,606, entitled "Laser Radar Scanning System," issued Apr. 6, 1993, to LTV Missiles and Electronics Group as assignee of the inventors Nicholas J. Krasutsky, et al.; and U.S. Letters Pat. No 5,224,109, entitled "Laser Radar Transceiver," issued Jun. 29, 1993, to LTV Missiles and Electronics Group as assignee of the inventors Nicholas J. Krasutsky, et al.

However, any suitable mechanism known to the art may be employed.

This particular embodiment of the invention includes a LADAR seeker head ("LASH") aboard the platform 510 in FIG. 5A. The manner in which this LASH generates, transmits, and receives a LADAR scan pattern is fully disclosed and claimed in U.S. Letters Pat. No. 5,200,606, first mentioned above. This particular LASH splits a single 0.2 mRad $1/e^2$ laser pulse into septets, or seven individual beamlets, with a laser beam divergence for each spot of 0.2 mRad with beam separations of 0.4 mRad. The optics package includes fiber optical array (not shown) having a row of seven fibers spaced apart to collect the return light. The fibers have an acceptance angle of 0.3 mRad and a spacing between fibers that matches the 0.4 mRad far field beam separation. An elevation scanner (not shown) spreads the septets vertically by 0.4 mRad as it produces the vertical scan angle. The optical transceiver including the scanner is then scanned azimuthally to create a full scan raster.

Still referring to FIG. 5A, the optics package aboard platform 510 transmits the beamlets while scanning elevationally 550 and azimuthally 540. The scan pattern 520 therefore comprises a series of successive elevational scans, or "nods," 530. The laser signal 415 is continuously reflected back to the platform 510, as indicated by the arrow 570, which receives the reflected laser signal. The total return from each scan pattern 520 is known as a "scan raster." Data is obtained from the received signal and processed. The data may, for instance, be processed to display an image or to provide image data for use in identifying an object (not shown) detected within a scan pattern 520. The reflected signal is then comprised of azimuthally spaced nods 530.

Figure 6A:
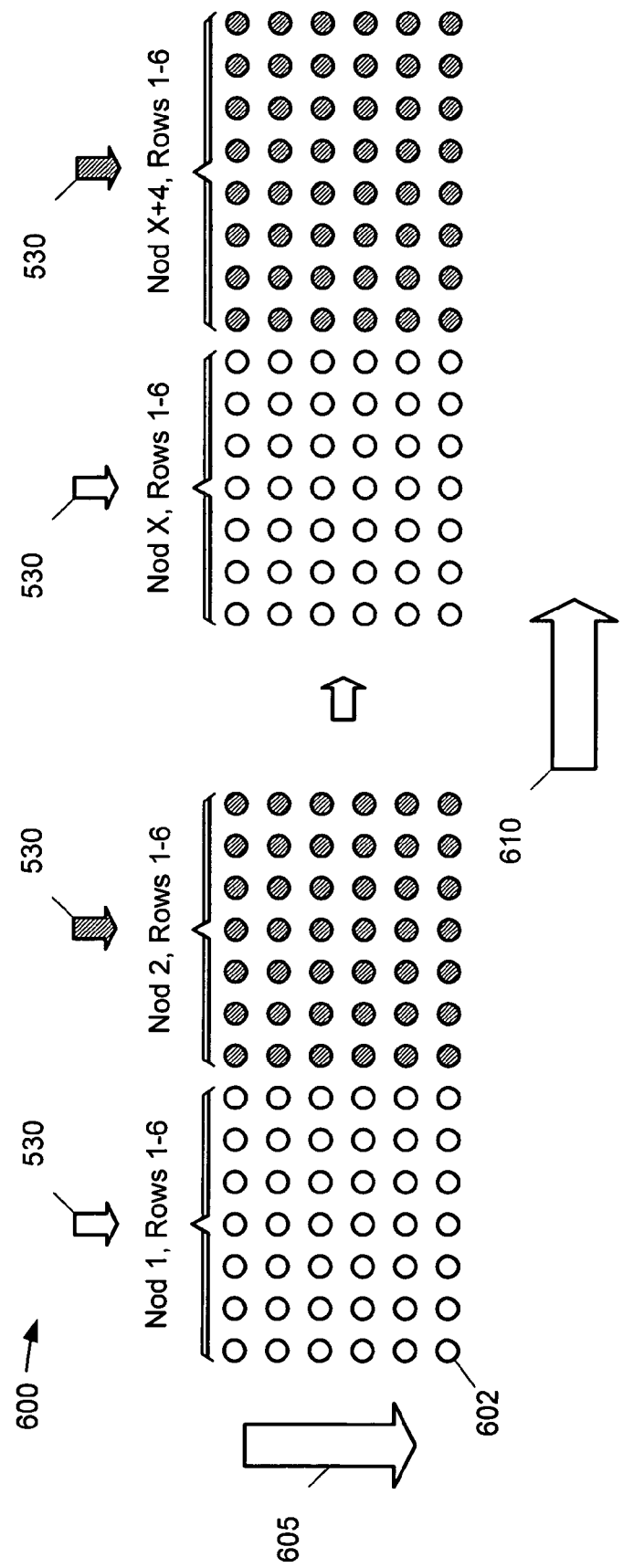

The nods 530 are combined to create a nod pattern such as the nod pattern 600 shown in FIG. 6A. The nod pattern 600 is comprised of a plurality of pixels 602, only one of which is indicated. Each pixel 602 corresponds to a single one of the reflected beamlets. The location of each pixel 602 in the nod pattern 600 represents an elevation angle and an azimuth angle between the object reflecting the beamlet and the platform 510. Each pixel 602 has associated with it a "range," or distance from the reflecting surface, derived from the time of flight for the beamlet. Some embodiments may alternatively derive the range from the phase of the reflected signal. Each pixel 602 also has associated therewith an energy level, or intensity, of the reflected beamlet.

The acquisition technique described above is what is known as a "scanned" illumination technique. Note that alternative embodiments may acquire the LADAR data set using an alternative technique known as "flash" illumination. However, in scanned illumination embodiments, auxiliary resolution enhancement techniques such as the one disclosed in U.S. Letters Pat. No 5,898,483, entitled "Method for Increasing LADAR Resolution," issued to Apr. 27, 1999, to Lockheed Martin Corporation as assignee of the inventors Edward Max Flowers, ("the '483 patent") may be employed.

The technique in the '483 patent reduces the elevational and azimuthal scan rates of the imagine system 400 by integer amounts greater than 1 to generate a LADAR image 600a, shown in FIG. 6B. The LADAR image 600a comprises a plurality of combined nods 530a having a angular resolution directly proportional to the reduction in the elevational and azimuthal scan rates. For instance, halving the elevational and azimuthal scan rates will double the angular resolution of the LADAR image 600a relative to the LADAR image 600 in FIG. 6A, as is shown in FIG. 6B. However, such auxiliary enhancement techniques are not necessary to the practice of the invention.

Each nod pattern 600 from an azimuthal scan 540 constitutes a "frame" of data for a LADAR image. The LADAR image may be a single such frame or a plurality of such frames, but will generally comprise a plurality of frames. Note that each frame includes a plurality of data points 602, each data point representing an elevation angle, an azimuth angle, a range, and an intensity level. The data points are stored in a data structure (not shown) resident in the data storage 455, shown in FIG. 4, of the storage 430 for the imaging system 400. The elevation angle, azimuth angle, and range are used to compile a "three-dimensional" image for the frame and the elevation angle, azimuth angle, and intensity are used to compile an "intensity" image for the frame. Thus, any given LADAR image can be said to comprise a plurality of frames of three-dimensional data, each frame comprising a three-dimensional image and an intensity image defined by the data of the given frame.

FIG. 7A and FIG. 7B illustrate one particular implementation 700 of a technique for enhancing the resolution of LADAR data, generated as described relative to FIG. 1-FIG. 6B, in accordance with the present invention. Many of the elements of FIG. 7A, like many of the elements in FIG. 2A, represent functional blocks of code in the application 450, shown in FIG. 4, residing on the storage 430. Referring now to FIG. 7A, the LADAR image 600 is acquired as described above, each data point representing an elevation angle $\theta_e$, an azimuth angle $\theta_a$, a range R, and an intensity level I. The LADAR image 600 comprises, a plurality of frames $F_0$-$F_n$ each frame $F_n$ comprising a three-dimensional image 701 and an intensity image 703.

In the illustrated embodiment, the LADAR image 600 is processed on a frame-by-frame basis. Note that each frame $F_0$-$F_z$ may represent a region of interest in the LADAR data set surrounding an object previously detected in the field of view for the imaging system 400. The ROI can be, for example, 100×100×100 voxels such that when re-sampling occurs, the resulting image will be on the order of, for example, 200×200×200 voxels, which represents an oversampling of two times in each dimension.

Each frame $F_n$ of the LADAR image 600 passes through a Cartesian coordinate transformation 702 before being captured by the 3D data capture unit 704 and the intensity data capture unit 706. On a moving platform, the Cartesian (x, y, z) coordinate data has a transformation applied to remove/compensate for the motion of the platform carrying the sensor. The data capture by the 3D data capture 704 and the intensity data capture 706 typically comprises storing the three-dimensional data (i.e., x, y, z) and the intensity data (i.e., the intensity values I mapped to a corresponding x, y, z data point) in the data storage 455, shown in FIG. 4. The data storage 455 may be encoded in any suitable storage device known to the art. Note that the three-dimensional and intensity images 701, 703 for the LADAR image 600 are captured separately in the implementation 700.

In the illustrated embodiment, after the Cartesian coordinate transformation 702, the LADAR image 600 is provided to the object tracker 705. The object tracker 705 is a part of the ATR system, and tracks an object in the field of view for the imaging system 400. For instance, with reference to the illustrated embodiment, the tank 465, shown in FIG. 4, may move around the scene 465 and potentially may move out of the field of view 525, shown in FIG. 5A, for the platform 510. The platform 510 may also be moving at a relatively rapid pace, and the field of view 525 may move beyond the tank 465 in the scene 450. The object tracker 705 issues appropriate commands to the imaging system 400 so that the imaging system 400 acquires the LADAR image 600 from a field of view 525 in which the tank 465 remains approximately centered. One benefit of the object tracker 705 is that as each frame $F_n$ is processed, only a center portion thereof corresponding to a portion (e.g., one-half) of the field of view 525 may be used in subsequent calculations. Object trackers such as the object tracker 705 are well known to the art and any suitable object tracker may be used.

Note that the LADAR image 600 can be pre-processed to improve data quality. Such pre-processing (not shown) can include a variety of spatial filtering techniques such as, for instance, gain and level correction. A variety of pre-processing techniques are commonly known in the art. One suitable pre-processing technique is disclosed in the aforementioned U.S. Letters Pat. No. 5,682,225. Still other techniques can be used for improving image quality. Since the three-dimensional and intensity data captures occur in parallel, this type of pre-processing may also generally occur in parallel. This type of pre-processing may be performed either before or after capture, but typically after. However, such pre-processing is not necessary to the practice of the invention.

More particularly, to improve image quality, a gain and level correction block (not shown) can be optionally applied to the new frame $F_n$. Gain and level correction can be used to, for example, remove noise components from new frame $F_n$ by calibrating each pixel. The noise components to be removed by calibrating each pixel are, for example, caused by variations in the gain and level from one detector element to the next, as well as pulse to pulse energy fluctuations in the transmitted laser pulses. The above referenced U.S. Letters Pat. No. 5,682,225 discloses one suitable technique. These gain and level variations are passed to the corresponding pixel values during acquisition of original LADAR image.

Once captured, a new frame $F_n$ is correlated (at 708) to a template frame $T_f$, as was discussed above, relative to FIG. 1. The template frame $T_f$ also comprises a three-dimensional image 707 and an intensity image 709. The template frame $T_f$ may be, for example, 32×32×32 pixels in size to provide sub-pixel target centroids. There are many techniques known to the art for selecting and maintaining a template frame such as the template frame $T_f$. Any suitable technique known to the art may be used. Several of these will be discussed further below. In one particular embodiment, the template frame $T_f$ is the same size as the new frame $F_n$, less a border region (not shown) of the new frame $F_n$. The size of the border region can be selected based on the amount of "walking" that will occur from one frame to the next such that the centroid can be accurately determined.

As illustrated in FIG. 7A and FIG. 7B, the correlation is performed separately and in parallel for the three-dimensional image 701 (at 710) and the intensity image 703 (at 708) of the new frame $F_n$ by separate 3D and 2D data correlators 712, 714, respectively. Note that the correlations (at 708, 710) need not be performed in parallel in all embodiments. In some embodiments, for instance, the correlations (at 708, 710) can be performed in serial and, in these cases, only a single correlator 712, 714 may be used. However, most embodiments will have time constraints for real-time or near real-time processing of the LADAR image 600 that will generally mitigate for separate and parallel processing of the three-dimensional and intensity images 701, 703 of the new frame $F_n$.

More particularly, the intensity image 703 of the new frame $F_n$ is correlated (at 708) to a 2D intensity image 709 of the template frame and the 3D image 701 of the new frame $F_n$ is correlated (at 710) to a 3D image 707 of the template frame $T_f$. Each of the 3D and 2D data correlators 712, 714 is a Mean Absolute Difference ("MAD") correlator that subtracts the template frame $T_f$ from the new frame $F_n$ in a point-wise fashion. The magnitudes of the results are then averaged for each valid point of the object that is totally enclosed in the respective frames, i.e., in the region of interest. With the ability to transform the intensity image (knowing the 3D location of each point), the 2D MAD correlator 714 can account for scale and translation.

Image correlation stabilizes the new frame $F_n$ and assists in the correction of any line of sight ("LOS") deviations between the template frame $T_f$ and the new frame $F_n$. Thus, the 3D and 2D data correlators 712, 714 ensure that the new frame $F_n$ and the template frame $T_f$ are aligned to within a fraction of a pixel. The 3D and 2D data correlators 712, 714 generate 3D shift matrix and 2D shift vector 711 and 713, respectively. The first and second shift lattices 715, 717 quantify any shift between the new frame $F_n$ and the template frame $T_f$. The first and second shift lattices 715, 717 can therefore align the intensity image 703 and the three-dimensional image 701 of the new frame $F_n$ with the intensity image 709 and the three-dimensional image 707, respectively, of the template frame $T_f$. The first and second shift lattices 715, 717, when applied, align the new frame $F_n$ with the template frame $T_f$.

The implementation 700 then registers (at 724) the new frame $F_n$ with the template frame $T_f$ in the interpolators 720, 722 using the first and second shift vectors 711, 713. More particularly, the interpolators 720, 722 align the shift matrix, or lattice, 715 and the shift lattice 717 and apply them to the three-dimensional image 701 and the intensity image 703, respectively. The new frame $F_n$ is then re-sampled (e.g., oversampled) by, for example, a factor of four. The resulting shifted and re-sampled new frame $F_n$ will be spatially registered with the template frame $T_f$. The shifting and magnification are performed, for example, by means of bilinear interpolation for the intensity image and 3D interpolation for the 3D image. The registered frame will have invalid regions that can be set to zero. The shifted intensity and three-dimensional images 727, 729 comprise the registered new frame $F_{nr}$.

The output sample lattices 715, 717 are generally a size equal to the size difference between the new frame $F_n$ and the template frames $T_f$ plus one. The output sample lattice 715, 717 can be analyzed to determine the center of the target in the respective image 701, 703 of the new frame $F_n$. The output sample lattices 715, 717 include a set of numbers indicating how similar the template frame $T_f$ and the new frame $F_n$ are at each point in each image. The pixel value in the output sample lattices 715, 717 having the smallest number associated with it represents the center point of the new frame $F_n$ that is most similar to the template frame $T_f$. To better find the true center pixel, the most-likely center pixel can first be determined by using measures of the correlation value and the distance from the anticipated center. This determination can be done using any suitable technique known to the art.

The illustrated embodiment generates output sample lattices 715, 717 by performing a sub-voxel interpolation in a 3D interpolator 720 and sub-pixel interpolation in a Bilinear Interpolator ("BLI") 722. Sub-pixel and sub-voxel interpolations of this sort are known to the art, and any suitable technique may be used. For instance, one suitable, exemplary BLI is disclosed in U.S. Pat. No. 5,801,678, entitled "Fast Bi-Linear Interpolation Pipeline", issued Sep. 1, 1998, to Industrial Technology Research Institute as assignee of the inventors Huang, et al.

The sub-voxel interpolation is performed on a 5×5×5 voxel region surrounding the center voxel to find the true centroid of the target in the three-dimensional and intensity images 701, 703 of the new frame $F_n$. Accordingly, a fourth-order polynomial can be generated to fit the x, y, and z means and a minimum value determined for the polynomial fit. The minimum value of the polynomial fit represents the true centroid in the second frame to within, for example, $\frac{1}{20}^{th}$ of a pixel.

The implementation 700, in the illustrated embodiment, also re-samples (at 728) the template frame $T_f$. The template frame $T_f$ can be re-sampled using, for example, by the 3D interpolator 720 and the BLI 722. The re-sampled template frame $T_{fr}$ (not shown) can be derived from the template frame $T_f$ alone, or from any combination of earlier processed frames.

The implementation 700 then temporally averages (at 730) the registered new frame $F_{nr}$ with the re-sampled template frame $T_{fr}$ in the temporal filter 732. The temporal filter 732 can be implemented in a temporal recursive frame filter if correlation metrics indicate that a suitable centroid was determined as described above. By using, for example, a temporal recursive frame filter with tapered coefficients equal to $1-(1/j)$, where j is the number of recursive iterations, a faster response can be achieved from the filter with greater noise reduction. Zeros at the edges of the field of view should not be updated.

The temporal averaging produces an "averaged" frame $F_A$, comprised of an averaged 3D image 733 and an averaged intensity image 735. The averaged frame $F_A$ is populated with an enhanced resolution that improves three-dimensional spatial resolution and range resolution. The averaged frame $F_A$ exhibits improved range performance through an increase in the Signal-to-Noise Ratio ("SNR") and range accuracy relative to the new frame $F_n$. The illustrated embodiment also spatially filters the registered new frame $F_{nr}$ in a manner not shown, including, for instance, edge enhancement and histogram projections. Thus, the application of the invention improves spatial resolution, range accuracy, range resolution, and poor weather performance (e.g., dropout replacement).

Returning to FIG. 6, the LADAR image 600, once temporally/spatially filtered as described above, can be employed in a number of ways. The implementation 700, in FIG. 7A-FIG. 7B, displays the averaged frame $F_A$ exhibiting enhanced resolution. Accordingly, the implementation 700 subjects the 3D image 733 and the intensity image 735 of the averaged frame $F_A$ to an auxiliary LADAR enhancement routine 734, conceptually illustrated in FIG. 8.

Figure 8:
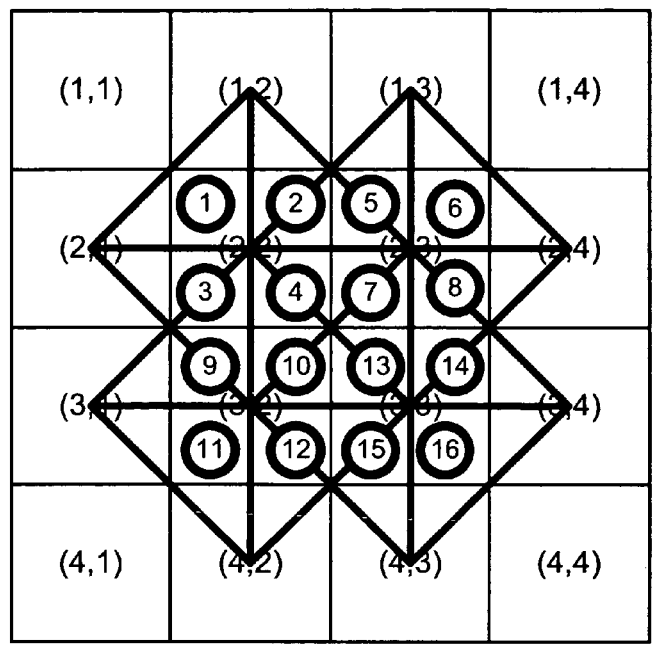

FIG. 8 depicts a conceptualized 4×4 pixel, three-dimensional image 733 for an averaged frame $F_A$ comprising 16 voxels designated (1,1) to (4,4). Each voxel is treated as a pixel considered as a point on a plane. The "pixels" define a plurality of triangles 1-16 with its 4 nearest, adjoining neighbors. For greater clarity, the portions of the three-dimensional image in FIG. 8 are shown separately in FIG. 9A-FIG. 9D. Each of the triangles 1-16 has a centroid (x, y, z), a normal vector, and an intensity value (i.e., the average of the intensities of the three pixels used to form the triangle). For the 3D data, we get the centroid of the triangle for x, y, z. For intensity, it is the average of the three points that define the triangle. The triangles 1-16 can then be displayed on the display 435 using any of a variety of well known video rendering routines available for three-dimensional display. Since the data is 3D, even the 2D intensity is a "texture" on the 3D data, the edge enhancement techniques do not really apply. The display of 3D data is done similar to a computer game, e.g., a user can rotate the data and view it from various perspectives.

Target acquisition is provided closer to the fundamental diffraction limit defined by, for example, the optics associated with sensors and the waveband of operation. The resulting image provided to the display 435 can, therefore, be a highly stabilized image with exceptional SNR and resolution performance.

To overcome any eye-to-display limitations, the pixel depth of the image resulting from edge enhancement filter can be optionally changed with the use of histogram projection (not shown) before being provided to display 435. Changing the pixel depth of an image using histogram projection is known in the art, and is described, for example, in U.S. Letters Pat. No. 6,359,681, entitled "Combined Laser/FLIR Optics System", issued Mar. 19, 2002, to the assignee Lockheed Martin Corporation in the name of the inventors Brien J. Housand, et al., and commonly assigned herewith. In addition or alternatively to changing the pixel depth of the image, the image resulting from edge enhancement filter can be optionally interpolated using, for example, bilinear interpolation to re-sample the image to either reduce or enlarge the size of the image before being provided to display 435.

In general, the data will usually be processed for display. Typical displays show 256 shades of gray (i.e., 8-bit) data. Most passive electro-optical devices (e.g., forward looking infrared, or "FLIR", devices) collect 12-bit or 14-bit data that that is "compressed" to 8-bits. This is usually done with a histogram projection. The same applies to LADAR intensity, which is usually collected as 12-bit intensity data and then compressed to 8-bits for display. In addition, the LADAR intensity return is a function of range (the 3-D piece). For example, if two objects have the same intensity, but one is farther away from the sensor than the other, the distant object will look "dimmer". This can be correct using a $1/r^2$ factor as a multiplicative factor to "normalize the image" and take the distance out of the equation.

Figure 10:
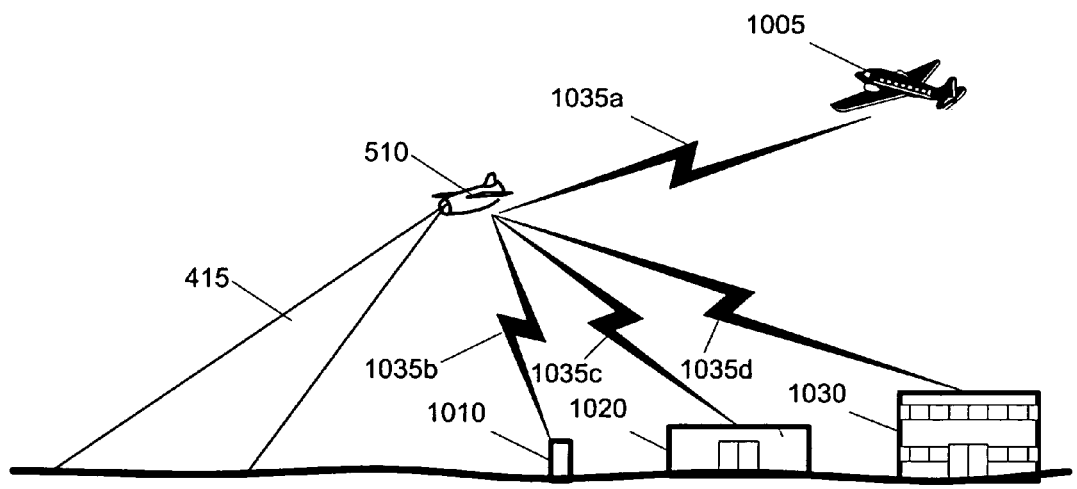
FIG. 10 illustrates several different mission scenarios in which the present invention may be employed.

Note that the display 435 need not be located on or in the platform with the rest of the imaging system 400. Consider the platform 510 in FIG. 5A. If the platform 510 is a manned aircraft, then the display 435 may be rack-mounted aboard the aircraft. However, if the platform 510 is an unmanned reconnaissance drone or a flying submunition, then the display 435 may be located remotely from the rest of the imaging system 400, as is illustrated in FIG. 10. For instance, the display 435 in these embodiments may be disposed aboard an airborne command center 1005, at a forward observation post 1010, at a rear-echelon command and control center 1020, or at a central processing facility 1030 over communications links 1035a-1035d. The forward observation post 1010, rear-echelon command and control center 1020, and the central processing facility 1030 may be airborne, ground-based (as shown) or marine. The communications links 1035a-1035d may be direct, line of sight communications, or satellite relays (not shown).

Furthermore, although the illustrated embodiment processes the LADAR image 600 contemporaneously upon its capture on the platform 510, this is not necessary to the practice of the invention. The present invention does not require application of the processing technique to contemporaneously acquired LADAR data. The LADAR image 600, upon capture, can be stored either on the platform 510 or some other location, e.g., the central processing facility 1030. Once stored, the LADAR image 600 can subsequently be processed in accordance with the present invention at whatever time is convenient. Indeed, the LADAR image 600 can be any LADAR image acquired and/or stored in any manner known to the art at any time previous to the application of temporal/spatial filtering technique disclosed herein.

Similarly, the processing of the LADAR image 600 need not take place contemporaneously with its acquisition and utilization of the processed LADAR image 600 need not be contemporaneous with the processing. The LADAR image 600 may, for instance, be acquired as discussed above, transmitted to the central processing facility 1030, shown in FIG. 10, over the communications link 1035d, where it is processed. The processed LADAR image 600 may then be batched with LADAR imagery from several other platforms 510 collected over a period of time, and then all transmitted from the central processing facility 1030 to the rear-echelon command and control center 1020. Such a scenario may be useful for battle damage assessment in a wartime theatre of operations, for instance.

Returning to FIG. 7A, the application of the auxiliary LADAR enhancement routine 734 has additional benefits, as well. It results in finer three-dimensional data and gives surface normal data. Surface normal data may be valuable for subsequent use in the automatic target recognition ("ATR") system. For instance, the surface normal magnitude yields depth discontinuities that could be useful for gap and distance measurement, or for use in an autonomous vehicle negative obstacle detection.

As was mentioned earlier, the LADAR data set can be acquired using what is known as a "flash" illumination technique rather than the scanned illumination technique of the illustrated embodiment. In such embodiments, motion may be added to the line of sight ("LOS") for the imaging system 400 according to either a commanded LOS pattern or a random pattern to generate multiple frames of data. The multiple frames are generated by commanding a gimbal to move in either a commanded LOS pattern or a random pattern. This is in contrast to the scanned illumination technique, which moves the gimbal in a very precise manner and which allows for known shifts to align the images.

The present invention, however, uses image correlation to calculate the shift between two or more frames. Therefore, the specific LOS motion need not be known. Rather, the motion simply must be sufficient to ensure that the target image is sampled with different pixels. For example, the movement of the gimbal can be done in a circular or other two-dimensional pattern in order to guarantee that the target image is moved about a sufficient number of different pixels. However, any random motion of the gimbal will suffice. Such motion will allow for the fixed pattern noise to be integrated out.

Once the gimbal has been commanded to move, each of the multiple frames can be analyzed with an image correlation function and shifted back to the center of the FOV using in the sub-pixel interpolation. The shifting will place each of the multiple frames back to the same place as the target image was in the previous frame (i.e., spatially register each of the multiple frames with the template frame). Once this step is complete, each of the registered frames can be passed to the temporal filter or a frame integrator where each of the registered frames can be averaged with past frames. Temporal averaging will allow for noise integration, which will result in noise reduction. The resulting noise reduction will be observed in both the temporal and spatial domains.

However, the invention is not limited to use with LADAR data or to 3D imagery data in ATR systems. The invention admits wide variation in implementation and utilization. Still other mission scenarios in addition to those disclosed above will become apparent to those in the art having the benefit of this disclosure. These additional scenarios are considered to be within the scope and spirit of the invention as defined by the claims set forth below.

Sensor performance can often be limited in resolution by stabilization performance in high contrast conditions. Sensitivity, as can be represented, for example, by a SNR measure, also can limit performance in low contrast or low reflectivity conditions. Thus, extended range image processing in accordance with the present invention can overcome limitations associated with conventional systems and significantly increase the effective performance range. Additional effective range capabilities provide higher probability of target/object recognition and identification which can, for example, enhance the battlefield survivability of a military aircraft equipped with a system in accordance with the present invention, and reduce the risk of casualties due to friendly fire. Additional range provided in accordance with the present invention can also provide an increased margin of recognition and identification in poorer atmospheric conditions.

This concludes the detailed description. The particular embodiments disclosed above are illustrative only, as the invention may be modified and practiced in different but equivalent manners apparent to those skilled in the art having the benefit of the teachings herein. For instance, although the illustrated embodiments are largely software implemented, it will be apparent to those skilled in the art having the benefit of this disclosure that the functionality of the software may instead be implemented in hardware. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A computer-implemented method, comprising:
   accessing a set of three-dimensional imagery data; and
   processing the three-dimensional imagery data to enhance its spatial resolution including:
   registering a first frame of the three-dimensional imagery data with a first template frame to create a registered first frame;
   temporally filtering the registered first frame with the first template frame;
   registering a second frame of two-dimensional imagery data corresponding to the first frame of the three-dimensional imagery data with a second template frame of the two-dimensional imagery data corresponding to the first template frame to create a registered second frame; and
   temporally filtering the registered second frame of the two-dimensional imagery data with the second template frame of the two-dimensional imagery data;
   wherein the accessing and the processing are performed by a computing apparatus.

2. The computer-implemented method of claim 1, wherein registering the first frame of the three-dimensional imagery data includes:
   correlating the first frame of the three-dimensional imagery data to the first template frame to create a correlated frame; and
   performing a three-dimensional interpolation on the correlated frame.

3. The computer-implemented method of claim 2, further comprising sampling the correlated frame.

4. The computer-implemented method of claim 1, wherein processing the three-dimensional imagery data further includes at least one of:
   spatially filtering the first frame of the three-dimensional imagery data prior to registration;
   updating the first template frame;
   replacing the first template frame; and
   spatially filtering the temporally filtered frame created by temporally filtering the registered first frame with the first template frame.

5. A non-transitory program storage medium encoded with instructions that, when executed by a computing apparatus, perform a method comprising:
   accessing a set of three-dimensional imagery data; and processing the three-dimensional imagery data to enhance its spatial resolution including:
  registering a first frame of the three-dimensional imagery data with a first template frame to create a registered first frame;
  temporally filtering the registered first frame with the first template frame;
  registering a second frame of two-dimensional imagery data corresponding to the first frame of the three-dimensional imagery data with a second template frame of the two-dimensional imagery data corresponding to the first template frame to create a registered second frame; and
  temporally filtering the registered second frame of the two-dimensional imagery data with the second template frame of the two-dimensional imagery data;
  wherein the accessing and the processing are performed by the computing apparatus.

6. The non-transitory program storage medium of claim 5, wherein registering the first frame of the three-dimensional imagery data in the encoded method includes:
  correlating the first frame of the three-dimensional imagery data to the first template frame to create a correlated frame; and
  performing a three-dimensional interpolation on the correlated frame.

7. The non-transitory program storage medium of claim 6, wherein processing the three-dimensional imagery data in the encoded method further includes sampling the correlated frame.

8. The non-transitory program storage medium of claim 5, wherein processing the three-dimensional imagery data in the encoded method further includes at least one of:
  spatially filtering the first frame of the three-dimensional imagery data prior to registration;
  updating the first template frame;
  replacing the first template frame; and
  spatially filtering the temporally filtered frame created by temporally filtering the registered first frame with the first template frame.

9. An apparatus, comprising:
  a processor;
  an electronic storage from which the processor may read;
  a set of three-dimensional imagery data residing in the electronic storage; and
  an application residing in the electronic storage and performing, when executed by the processor, a method comprising:
    accessing the set of three-dimensional imagery data; and
    processing the three-dimensional imagery data to enhance its spatial resolution including:
      registering a first frame of the three-dimensional imagery data with a first template frame to create a registered first frame;
      temporally filtering the registered first frame with the first template frame;
      registering a second frame of two-dimensional imagery data corresponding to the first frame of the three-dimensional imagery data with a second template frame of the two-dimensional imagery data corresponding to the first template frame to create a registered second frame; and
      temporally filtering the registered second frame of the two-dimensional imagery data with the second template frame of the two-dimensional imagery data.

10. The apparatus of claim 9, wherein registering the first frame of the three-dimensional imagery data in the method includes:
  correlating the first frame of the three-dimensional imagery data to the first template frame to create a correlated frame; and
  performing a three-dimensional interpolation on the correlated frame.

11. The apparatus of claim 10, wherein processing the three-dimensional imagery data in the method further includes sampling the correlated frame.

12. The apparatus of claim 9, wherein processing the three-dimensional imagery data in the method further includes at least one of:
  spatially filtering the first frame of the set of three-dimensional imagery data prior to registration;
  updating the first template frame;
  replacing the first template frame; and
  spatially filtering the temporally filtered frame created by temporally filtering the registered first frame with the first template frame.

13. An apparatus, comprising:
  a data acquisition subsystem, comprising a processor, capable of acquiring a set of three-dimensional imagery data; and
  a data processing subsystem, comprising the processor, programmed to:
    access the set of three-dimensional imagery data; and
    process the three-dimensional imagery data to enhance its spatial resolution including to:
      register a first frame of the three-dimensional imagery data with a first template frame to create a registered first frame;
      temporally filter the registered first frame with the first template frame;
      register a second frame of two-dimensional imagery data corresponding to the first frame of the three-dimensional imagery data with a second template frame of the two-dimensional imagery data corresponding to the first template frame to create a registered second frame; and
      temporally filter the registered second frame of the two-dimensional imagery data with the second template frame of the two-dimensional imagery data.

14. The apparatus of claim 13, wherein the data acquisition subsystem includes:
  a laser capable of emitting optical radiation; and
  a detector subsystem capable of receiving the emitted optical radiation upon its reflection.

15. The apparatus of claim 13, wherein three-dimensional imagery data is LADAR data or stereo imaging data.

16. The apparatus of claim 13, wherein registering the first frame of the three-dimensional imagery data includes:
  correlating the first frame of the three-dimensional imagery data to the first template frame to create a correlated frame; and
  performing a three-dimensional interpolation on the correlated frame.

17. The apparatus of claim 13, wherein the data processing subsystem is further capable of tracking an object in a field of view for the data acquisition subsystem.

18. The apparatus of claim 13, wherein the data processing subsystem is further capable of:
  converting the first frame of the three-dimensional imagery data to Cartesian coordinates to create a converted frame; and capturing the converted frame.

19. The apparatus of claim 13, wherein the data processing subsystem is further capable of:
spatially filtering the first frame of the three-dimensional imagery data prior to registration;
updating the first template frame;
replacing the first template frame; and
spatially filtering the temporally filtered frame created by temporally filtering the registered first frame with the first template frame.

20. The apparatus of claim 13, wherein the apparatus comprises a portion of an airborne platform.

21. The apparatus of claim 13, wherein the data acquisition subsystem comprises a portion of a platform and the data processing subsystem is located remotely from the platform.

22. The apparatus of claim 13, further comprising a display.

23. A computer-implemented method, comprising:
accessing a set of three-dimensional imagery data; and
processing the three-dimensional imagery data to enhance its spatial resolution including:
registering a frame of the three-dimensional imagery data with a template frame to create a registered first frame including:
correlating an intensity image of a new frame of LADAR data to an intensity image of the template frame; and
correlating a three-dimensional image of the new frame to a three-dimensional image of the template frame;
temporally filtering the registered first frame with the template frame;
wherein the accessing and the processing are performed by a computing apparatus.

24. A computer-implemented method for enhancing LADAR data resolution, comprising:
correlating an intensity image of a new frame of laser detection and ranging (LADAR) data to an intensity image of a template frame;
correlating a three-dimensional image of the new frame to a three-dimensional image of the template frame to create a correlated three-dimensional image;
performing a sub-voxel interpolation on the correlated three-dimensional image;
registering the new frame with the template frame subsequent to correlation and interpolation; and
temporally filtering the registered new frame with the template frame;
wherein the correlating, the interpolating, the registration, and the temporal filtering are performed by a processor.

25. The computer-implemented method of claim 24, wherein correlating the intensity image of the new frame to the intensity image of the template frame includes:
subtracting the intensity image of the template frame from the intensity image of the new frame in a point wise fashion; and
outputting a shift vector.

26. The computer-implemented method of claim 24, wherein registering the new frame with the template frame includes performing a sub-pixel interpolation on a predetermined region around a center pixel of a target in the intensity image of the new frame to locate a true centroid.

27. The computer-implemented method of claim 26, wherein the predetermined region is a 5×5 pixel region.

28. The computer-implemented method of claim 24, further comprising re-sampling at least one of the new frame and the template frame.

29. The computer-implemented method of claim 24, further comprising acquiring three-dimensional imagery data.

30. The computer-implemented method of claim 29, wherein acquiring the three-dimensional imagery data includes:
detecting a signal whose characteristics are represented by the three-dimensional imagery data;
capturing the three-dimensional imagery data; and
storing the three-dimensional imagery data.

31. The computer-implemented method of claim 24, further comprising further enhancing the resolution of the temporally filtered frame for display.

32. The computer-implemented method of claim 24, further comprising displaying the temporally filtered frame.

* * * * *